(12) United States Patent
Itabashi et al.

(10) Patent No.: US 6,333,617 B1
(45) Date of Patent: Dec. 25, 2001

(54) INDUCTIVE LOAD DRIVE CONTROL FOR SELECTIVELY EXTINGUISHING ENERGY THROUGH SWITCHING DEVICES OR DIODES

(75) Inventors: Toru Itabashi, Anjo; Hideaki Tamai, Kariya, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/580,572

(22) Filed: May 30, 2000

(30) Foreign Application Priority Data

Jun. 10, 1999 (JP) .................................................. 11-163996

(51) Int. Cl.$^7$ ....................................................... H02R 5/34
(52) U.S. Cl. ........................... 318/801; 318/798; 318/599
(58) Field of Search ..................................... 318/599, 801, 318/798; 363/98, 17, 132

(56) References Cited

U.S. PATENT DOCUMENTS

| | | | |
|---|---|---|---|
| 5,343,382 | * | 8/1994 | Hale et al. ............................ 318/599 |
| 5,379,209 | * | 1/1995 | Goff ..................................... 318/599 |
| 5,712,550 | | 1/1998 | Boll et al. . |
| 6,075,334 | * | 6/2000 | Sagues et al. ................... 318/568.11 |
| 6,130,831 | * | 10/2000 | Matsunaga ............................. 363/98 |

FOREIGN PATENT DOCUMENTS

| | | |
|---|---|---|
| 5-038188 | 2/1993 | (JP) . |
| 9-183113 | 1/1997 | (JP) . |
| 9-18313 | 1/1997 | (JP) . |

* cited by examiner

*Primary Examiner*—Karen Masih
(74) *Attorney, Agent, or Firm*—Nixon & Vanderhye P.C.

(57) ABSTRACT

In a motor drive control, four MOSFETs are connected in an H-bridge configuration, and four diodes are connected in parallel with the MOSFETs, respectively. A pair of MOSFETs at the high side are forced to turn on to form a current circulation path including a direct current motor during a deenergization of the motor when a motor current is low. Thus, the energy in a motor coil is extinguished through the switching devices. The MOSFETs are forced to turn off to open the current circulation path during the deenergization of the motor when the motor current is high. Thus, the diodes are forward-biased to conduct and extinguish the energy in the motor coil through the diodes. According to this selective use of the switching devices or the diodes is effective to reduce a power loss over an entire range of motor currents.

14 Claims, 11 Drawing Sheets

INDUCTIVE LOAD DRIVE CONTROL FOR SELECTIVELY EXTINGUISHING ENERGY THROUGH SWITCHING DEVICES OR DIODES

CROSS REFERENCE TO RELATED APPLICATION

This application relates to and incorporates herein by reference Japanese Patent Application No. 11-163996 filed on Jun. 10, 1999.

BACKGROUND OF THE INVENTION

The present invention relates to an electrical inductive load drive control which is applicable to, for instance, an electronic throttle control apparatus for vehicles for driving a throttle valve disposed in an engine intake pipe by a direct current motor in accordance with an accelerator pedal position and the like.

An H-bridge drive circuit is conventionally used as a load drive apparatus for driving an electrical load such as a direct current motor having inductive coils. In this load drive device, four switching devices are diagonally connected to cross each other. The energization or deenergization of the load are switched by turning on or off the switching devices at certain duty ratios.

It is necessary to extinguish energy which is generated in the coil of the direct current motor, when the switching device is turned off to change the direct current motor from the energized condition to the deenergized condition.

In JP-A-9-18313, it is proposed to turn on two switching devices at high side or low side to form a closed loop including the load, thereby extinguishing the energy generated in the coil of the direct current motor through the closed loop. It is also proposed to connect diodes in parallel with the drive terminals of the switching device to extinguish the energy generated in the coil. For instance, the body diode integrally built in a MOSFET is forward-biased when the direct current motor is deenergized, thereby extinguishing the generated energy between a power source and the ground through the body diode.

MOSFETs are generally used as switching devices. In the MOSFET, as shown in FIG. 12A, power loss Pm between its drain and its source increases remarkably as electric current between its drain and its source. The power loss Pm of the MOSFET at the time of energy extinction increases in proportion to the square of the current I and the on-resistance R of the MOSFET, that is, $Pm=R \times I^2$.

In diodes, a forward voltage Vf increases gradually as a forward current I increases, so that power loss Pd in the forward direction increases as shown in FIG. 12B, that is, $Pd=Vf \times I$.

Accordingly, the power loss Pm increases remarkably as the current I increases at the time of deenergization of the direct current motor in the case of extinguishing the energy through the closed loop, while the power loss Pm is rather small as long as the current I is relatively low. The change rate of power loss Pd is relatively low at the time of deenergization of the direct current motor in the case of the diode when the current I is low, while the power loss Pd is relatively low in comparison with the case of the closed loop when the current I is high.

If the low power loss should be reduced over a wide range of current I, the MOSFET must be sized large in chip size for a low on-resistance over the wide current range in the case of the closed loop. The MOSFET must be sized large to have a large allowable power loss in the case of the diode. In either case, the switching devices become expensive.

SUMMARY OF THE INVENTION

It is therefore an object of the present invention to provide an inductive load drive control capable of reducing power loss at the time of energy extinction and reducing cost of switching devices.

According to the present invention, an electrical inductive load such as a direct current motor is energized and deenergized by switching devices such as MOSFETs. Diodes are connected in parallel with the switching devices, respectively. A current supplied to the inductive load immediately before deenergizing the inductive load is detected. The inductive load is energized and deenergized by turning on and off the switching devices. The switching devices are forcedly turned on or off to extinguish energy generated in the inductive load at the time of changing from an energization to a deenergization of the inductive load. The switching devices are forced to turn on to extinguish the energy by circulating the energy therethrough when the current is small, while the switching devices are forced to turn off to extinguish the energy through the diodes when the current is large. Thus, power loss is minimized over an entire range of the current.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENT

Figure 1:
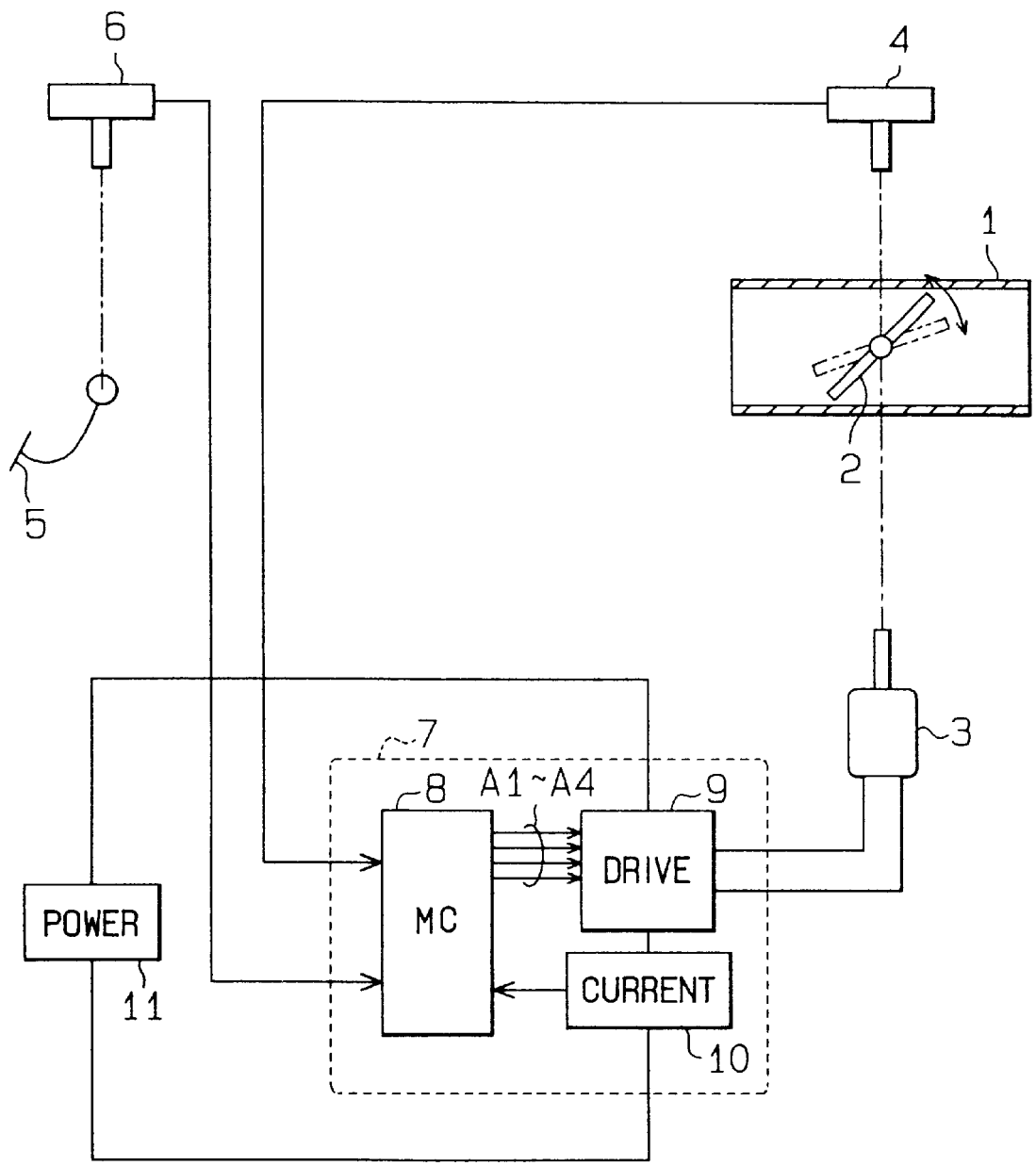
FIG. 1 is a block diagram showing an entire electronic throttle system according to a first embodiment of the present invention.

Embodiments of the present invention will be described below with reference to the drawings in which the same reference numerals are used to designate the same or similar parts. The present invention is applied to an electronic throttle control apparatus for automotive vehicles in the following embodiments.

(First Embodiment)

The entire system construction is described first with reference to FIG. 1. A throttle valve 2 is provided in an engine intake pipe 1 and supported rotatably in an opening and closing directions. The throttle valve 2 is biased in the valve closing direction by a return spring (not shown). The throttle valve 2 is coupled to an output shaft of a direct current motor 3 so that the throttle valve 2 is driven by the direct current motor 3 against the biasing force of the return spring. The motor 3 includes inductive coils therein.

More specifically, the throttle valve 2 is forced by the return spring to return to a substantially closed position which enables an engine idling operation. The direct current motor 3 applies a torque to drive the throttle valve 2 in the valve opening direction against the biasing force of the return spring. The current supplied to the direct current motor 3 is increased to produce a required torque at the time of starting to rotate the direct current motor 3 from the stationary position or braking the direct current motor 3 during the rotating operation.

The opening angle of the throttle valve 2 is detected by a throttle angle sensor 4. The pedal position of an accelerator pedal 5 controlled by a vehicle driver is detected by an accelerator position sensor 6.

The system has an electronic control unit 7 which controls the opening angle of the throttle valve 2 as well as an ignition timing and a fuel injection quantity. The electronic control unit 7 has a microcomputer (MC) 8, a direct current motor drive circuit 9 and a current detection circuit 10. The microcomputer 8 receives an angle detection signal of the throttle valve 2 from the throttle angle sensor 4 and a pedal position detection signal of the accelerator pedal 5 from the accelerator position sensor 6. The microcomputer 8 receives a temperature detection signal of an engine coolant in addition to the above sensor signals.

The microcomputer 8 produces drive command signals A1–A4 to the direct current motor drive circuit 9 in response to the received sensor signals. The microcomputer 8 calculates a final target opening angle of the throttle valve 2 from the accelerator pedal position and correcting by the coolant temperature. The microcomputer 8 further calculates rotation directions of the direct current motor 3, and calculates duty ratios of current supply (energization) to the direct current motor 3 based on a difference between the calculated target opening angle and the detected actual throttle opening angle. The drive command signals A1–A4 are produced as a result of this determination and calculation.

The direct current motor drive circuit 9 is configured in the H-bridge type to drive the direct current motor 3, and connected to a power source (vehicle-mounted battery) 11. The direct current motor drive circuit 9 receives the four drive command signal A1–A4 from the microcomputer 8 and supplies current to the direct current motor 3 to drive the throttle valve 2 to the target throttle angle set in accordance with the detected accelerator pedal position. The current detection circuit 10 detects the current supplied to the direct current motor 3.

Figure 2:
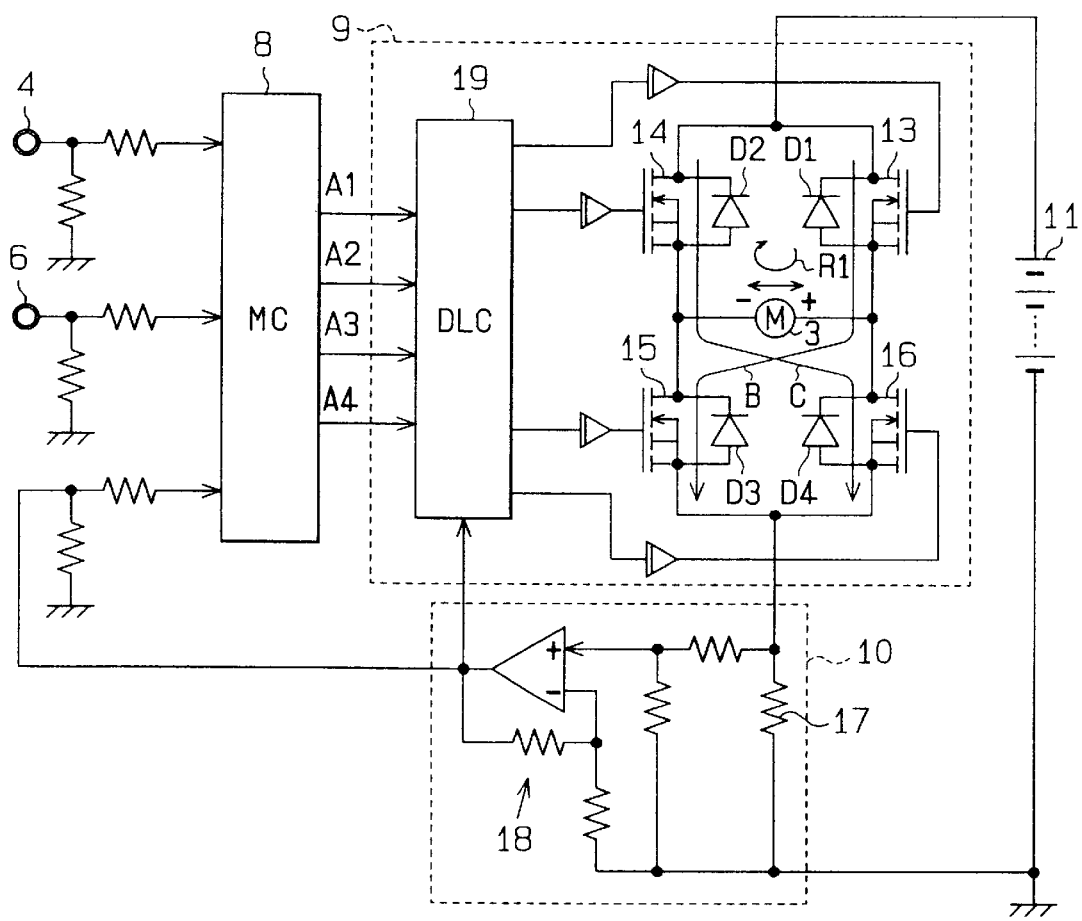
FIG. 2 is an electric circuit diagram showing a drive circuit used in the first embodiment.

As shown in FIG. 2 in detail, the direct current motor drive circuit 9 is constructed with four switching devices, MOSFETS 13, 14, 15 and 16, which are connected in the H-bridge type. The positive terminal and the negative terminal of the direct current motor 3 are connected to an intermediate junction between the MOSFETs 13 and 16 at the right side and an intermediate junction between the MOSFETs 14 and 15, respectively. The high side of the direct current motor drive circuit 9 is connected to the positive terminal side of the power source (battery) 11. The low side of the direct current motor drive circuit 9 is connected to the current detection circuit 10.

When the MOSFETs 13 and 15 provided in a diagonal relation with each other are turned on, the current flows in a direction (direct current motor forward rotation direction) B. When the MOSFETs 14 and 16 provided in a diagonal relation with each other are turned on, the current flows in a direction (direct current motor reverse rotation direction) C. When the MOSFETs 13 and 14 at the high side are turned on, the energy generated in the coil of the direct current motor 3 is circulated through a closed circulation path formed by the MOSFETs 13, 14 and the direct current motor 3 at the time of cutting off the current supply.

Body diodes (built-in diodes) D1–D4 are connected between the drain terminals and the source terminals of the MOSFETs 13–16, respectively. Each diode D1–D4 is a junction-type diode provided in each MOSFET. The diode is biased in the forward direction to allow current to flow therethrough, when the drain—source terminal path of the MOSFET is biased in reverse.

The current detection circuit 10 includes a current detection resistor 17 connected between the low side of the direct current motor drive circuit 9 and the ground, and a differential amplifier 18 which differentially amplifies voltages developed at both ends of the current detection resistor 17. A direct current motor energization current is detected by the current detection resistor 17, and a current detection signal is applied to the microcomputer 8 and a drive logic circuit (DLC) 19 of the direct current motor drive circuit 9.

The drive logic circuit 19 receives the drive command signals A1–A4 from the microcomputer 8, and drives the direct current motor 3 by turning on or off the MOSFETs 13–16 in response to the signals A1–A4.

Figure 3:
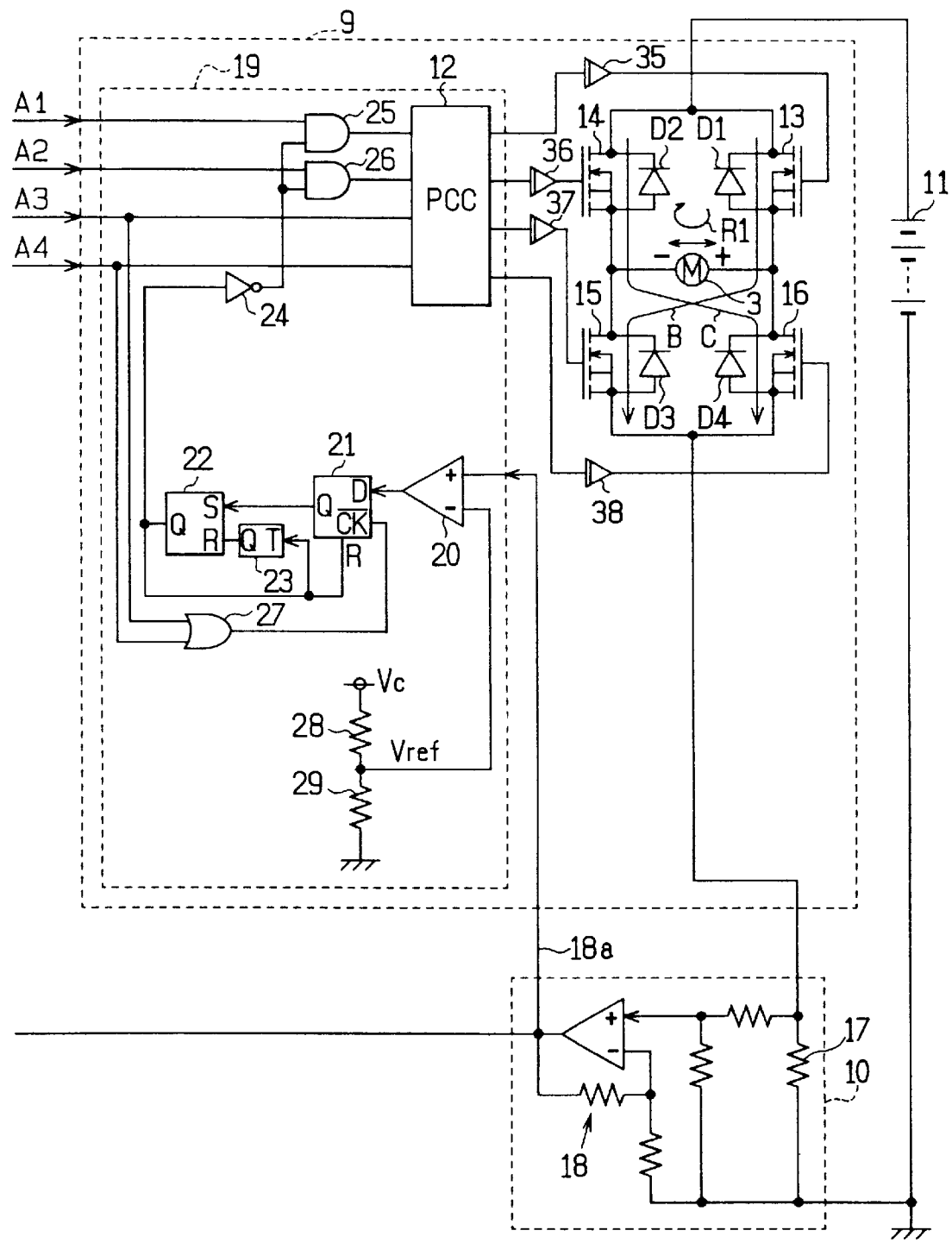
FIG. 3 is a detailed electric circuit diagram showing the drive circuit shown in FIG. 2.
Figure 4:
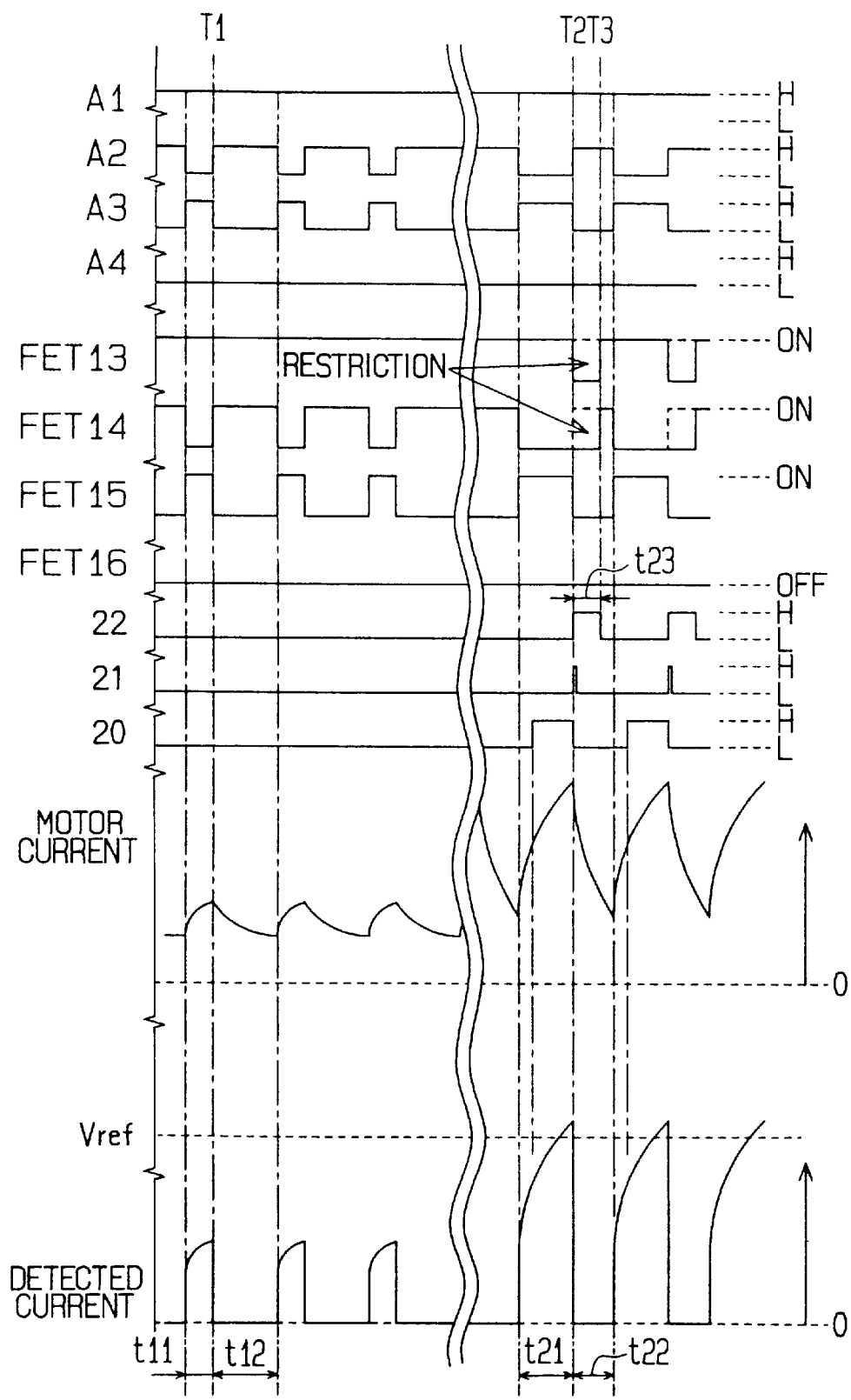
FIG. 4 is a timing diagram showing a part of the operation of the first embodiment.

The drive logic circuit 19 is constructed as shown in FIG. 3. In connection with this description, reference is made to a timing diagram of FIG. 4. FIG. 4 shows a condition in which the drive command signal A1 is normally held at the high (H) level, the drive command signal A4 is normally held at the (L) level, and other drive signals A2 and A3 are duty-controlled to alternately turn on and off oppositely to each other. When the drive command signal A3 is at the H-level, the MOSFET 15 turns on to increase the motor current. When the drive command signal A3 is at the L-level, the MOSFET 15 turns off to extinguish the energy generated in the coil of the direct current motor 3 through the circulation path R1. The current detection signal is shown at the bottom in FIG. 4.

As shown in FIG. 3, the output of the current detection circuit 10 (voltage corresponding to the detected current sullied to the direct current motor 3 when energized) is applied to the positive terminal (+) of a comparator 20 to be compared with a reference voltage Vref applied to the negative terminal (−). The reference voltage Vref is set by dividing a voltage Vc by resistors 28 and 29. The output of the comparator 20 changes to the H-level each time the detected current of the direct current motor 3 exceeds the reference value. This H-level signal is applied to the data input terminal D of a register 21 which comprises a D-type flip-flop. The drive command signals A3 and A4 are applied to an OR gate 27. The output of the OR gate 27 is applied to the inverted clock terminal/CK of the register 21.

The register 21 stores the signal level at the data input terminal D in synchronism with the falling edge of the drive command signal A3 or A4 at which the current supply to the direct current motor is shut off, and produces its output signal corresponding to the stored signal level from its output terminal Q. Thus, the register 21 produces the H-level signal, when the detected current is higher than the reference value indicated by the reference voltage Vref at the time of cutting off the motor current supply, that is, when the output of the comparator 20 is at the H-level at the time of direct current motor deenergization.

The output signal of the register 21 is applied to the set terminal S of a latch 22 which is comprised of an SR-type flip-flop (set priority-type). The output of a timer 23 is applied to the reset terminal R of the latch 22. The latch 22 is set by the H-level output of the register 21, and produces the H-level signal from its output terminal Q. This H-level signal is applied to the input terminal T of the timer 23.

The timer 23 starts counting a predetermined time interval t23 when the H-level is applied to the input terminal T, and produces the H-level signal from its output terminal Q upon the completion of counting the predetermined time interval t23. The output signal of the timer 23 is applied to the reset terminal R of the latch 22. The latch 22 is reset to produce the L-level signal from its output terminal Q when the H-level is applied to the reset terminal R. The timer 23 is reset to produce the L-level at its output terminal when the output of the latch 22 changes to the L-level.

The output signal of the latch 22 is also applied to the reset terminal R of the register 21. Thus, as long as the latch 22 produces the H-level signal, the register 21 is maintained reset and produces the L-level output signal.

For instance, at time T1 in FIG. 4, the detected current at the time of cutting off the current supply is lower than the reference value (Vref). The comparator 20 produces the L-level signal, and the output of the register 21 is maintained at the L-level. The latch 22 is not set.

At time T2 in FIG. 4, on the other hand, the detected current at the time of cutting off the current supply is higher than the reference value (Vref). The comparator 20 produces the H-level signal, and the output of the register 21 is changed from the L-level to the H-level. The latch 22 is set in response to the H-level signal of the register 21 and produces the H-level output signal. At this moment, the H-level output signal of the latch 22 is applied to the reset terminal R of the register 21. The output of the register 21 immediately changes to the L-level. Then, at time T3 when the predetermined time interval t23 counted by the timer 23 elapses, the output of the latch 22 changes to the L-level.

Referring to FIG. 3 again, the output signal of the latch 22 is also applied to a NOT gate (inverter) 24 to be inverted and applied to AND gates 25 and 26 which are applied with the drive command signals A1 and A2, respectively. The outputs of the AND gates 25 and 26 are applied to the gates of the MOSFETs 13 and 14 at the high side through a protective control circuit (PCC) 12 and pre-drivers 35 and 36, respectively. Thus, the MOSFETs 13 and 14 turn on when the drive command signals A1 and A2 are at the H-level and the output of the NOT gate 24 is at the H-level (the output signal of the latch 22 is at the L-level), respectively.

The drive command signals A3 and A4 are applied to the MOSFETs 15 and 16 at the low side through the protective control circuit 12 and pre-drivers 37 and 38, respectively. Thus, the MOSFETs 15 and 16 turn on when the drive command signals A3 and A4 are at the H-level, respectively.

In FIG. 4, the AND gates 25 and 26 produces the L-level signals during the period T2–T3 because the latch 22 produces the H-level output signal. As a result, the MOSFETs 13 and 14 at the high side are forced to turn off during the period T2–T3, even when the drive command signals A1 and A2 are at the H-level.

Although not shown in detail, the protective control circuit 12 shown in FIG. 3 includes a logic circuit which restricts an excessive feedthrough current from flowing due to simultaneous turning on of the MOSFETs 13–16 connected to the terminals of the direct current motor 3. It also includes an excessive current protective control logic circuit and the like which forcedly turns off the MOSFETs 13–16 when an excessive current flows.

Figure 5:
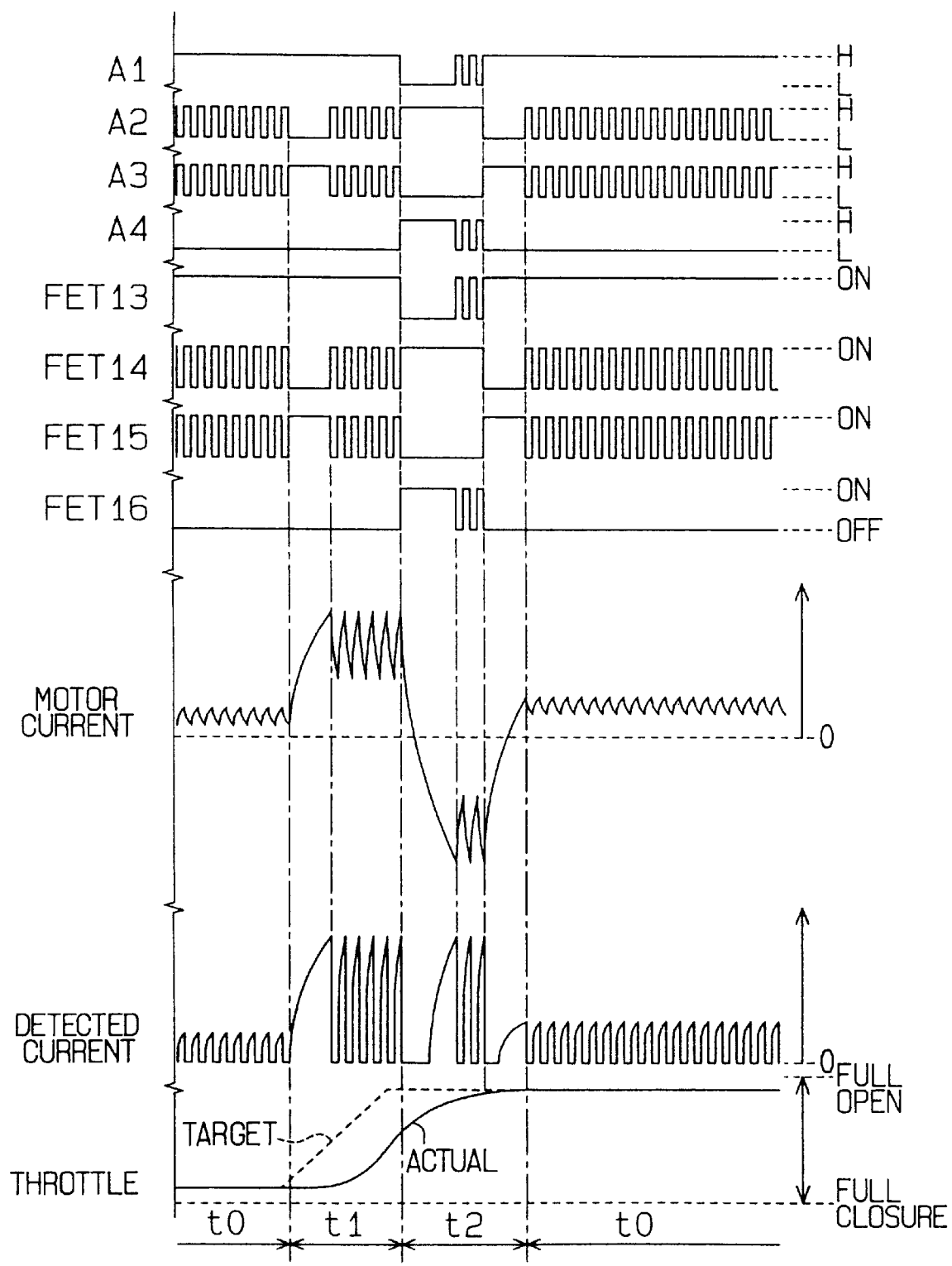
FIG. 5 is a timing diagram showing an operation of the first embodiment.

The operation of the electronic throttle control system according to the first embodiment is described next with reference to FIGS. 4 and 5. FIG. 5 show from the top to the bottom, signal levels of the drive command signals A1–A4, on/off conditions of the MOSFETs 13–16, the motor current, the detected current, and the throttle angle.

In FIG. 5, it is shown that the current supply to the direct current motor 3 is maintained at the fixed duty ratio to maintain the throttle valve 2 at its stationary condition to which it is driven. Further, at the time of starting the direct current motor 3 to rotate from its stationary condition or braking the same in its rotating condition, the motor current is increased to ensure a required torque.

In FIG. 5, during the period t0 in which the throttle angle is maintained unchanged, the microcomputer 8 maintains the drive command signal A1 at the H-level and alternately changes the drive command signal A3 to the H-level and L-level at the fixed frequency, so that the angle of the throttle valve 2 is maintained unchanged against the return spring. Thus, the MOSFET 13 is maintained turned on, and the MOSFET 15 is turned on and off at the fixed duty ratio. The direct current motor 3 is supplied with the current in the direction (forward direct current motor rotation direction) B to maintain the throttle valve 2 at the stationary condition. The motor current during this period t0 is maintained relatively low.

During this period t0, a feedback control is effected to maintain the actual angular position of the throttle valve 2 at the target angular position, as long as changes in the target throttle angle required in correspondence with the detected accelerator position are within a predetermined range or rates of the changes per unit time are within another predetermined range.

When the target throttle angle is changed in the throttle opening direction in response to a further pedal stroke of the accelerator pedal 5, a start-driving current supply to the direct current motor 3 is effected during a period t1 and then a braking current supply to the direct current motor 3 is effected during the following period t2.

Specifically, the microcomputer 8 produces the drive command signal A3 at 100% duty ratio to turn on the MOSFET 15 at the time of initiating the start-driving so that the direct current motor 3 is supplied with the motor current at 100% duty ratio at that time. When the motor current reaches a predetermined current limit value which does not lessen the start-driving performance, the duty ratio of the drive command signal A3 is regulated so that the MOSFET 15 is turned alternately on and off, thereby restricting the motor current from exceeding the current limit value.

Thus, during the start-driving period t1, the direct current motor 3 is driven at the 100% duty ratio and start-driving is effected to control the actual throttle angle to attain the target throttle angle. Then, the motor current is regulated at around the current limit value. The direct current motor 3 is enabled to rotate with a start torque sufficient to overcome the biasing force of the return spring in the throttle closing direction by the start-driving operation in the period t1. The throttle valve 2 thus can be driven with quick response.

When the microcomputer detects that the throttle valve 2 is actually driven closely to the target throttle angle, the braking current supply is initiated after the period t1 to brake the throttle valve 2 in motion so that the throttle valve 2 stops at the target throttle angle. In this period t2, differently from in the periods t0 and t1, the microcomputer 8 maintains the drive command signal A2 at the H-level and the drive command signal A3 at the L-level.

At the initiation of the braking current supply, the duty ratio of the drive command signal A4 is set to 100% duty ratio to turn on the MOSFET 16. The MOSFETs 14 and 16 turn on at the same time, and the direct current motor 3 is driven with 100% duty ratio in the reverse rotation direction (direction C in FIG. 3). The drive command signal A1 is in an opposite phase relation to the drive command signal A4.

When the motor current reaches another current limit value in the opposite direction, the microcomputer 8 regulates the duty ratio of the drive command signal A4 so that the MOSFET 16 alternately turns on and off and the motor current does not exceed the current limit value. In this braking current supply period t2, the throttle valve 2 is thus stopped quickly at the target throttle angle.

After the throttle valve 2 stops at the target throttle angle, the direct current motor 3 is controlled in the same manner as in the period to before the start-driving operation.

Referring to FIG. 4 again, the characteristic operation of the present embodiment is described. In FIG. 4, the left side shows a case in which the motor current (detected current at the time of deenergization) is in a range of low currents, that is, an operation in the period t0 in FIG. 5, and the right side shows a case in which the motor current (detected current at the time of deenergization) is in a range of high currents, that is, an operation in the period t1 in FIG. 5.

When the motor current is in the low current range, the drive command signals A1 and A3 are at the H-level to turn on MOSFETs 13 and 15d during a drive current supply period t11 so that the direct current motor 3 is energized in the direction B in FIG. 3. Thus, the motor current increases in the drive current supply period t11.

During an extinction period t12 in which the drive current supply is shut off, each time the drive command signal A3 is changed to the L-level, the drive command signal A2 is changed to the H-level for that L-level period. Each time the MOSFET 15 turns off, the MOSFET 14 turns on to circulate the energy generated in the coil of the direct current motor 3 through the circulation path R1 shown in FIG. 3. That is, at time T1 when the current supply is interrupted, the detected current of the current detection circuit 10 is lower than the reference current value (Vref) and the output of the comparator 20 is at the L-level.

Figure 6A:
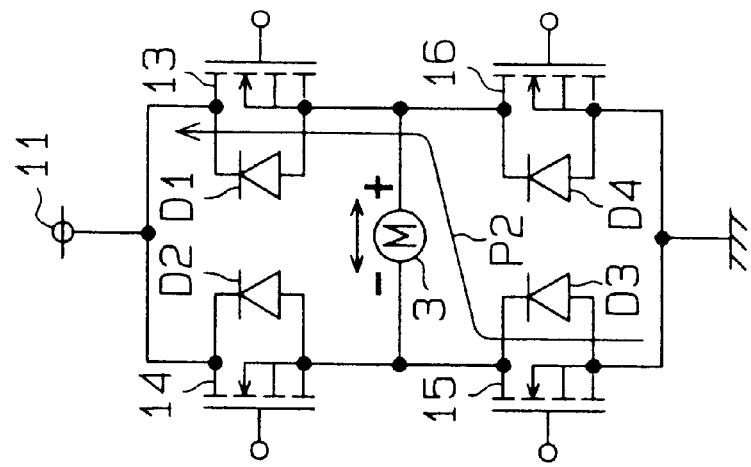
FIGS. 6A to 6C are circuit diagrams showing energy extinction operations of the drive circuit of the first embodiment.

The outputs of the register 21 and the latch 22 remain at the L-level. As a result, the signal applied from the latch 22 to the AND gates 25 and 26 through the NOT gate 24 is H-level, and the MOSTFETs 13 and 14 both turn on in response to the drive command signals A1 and A2. The energy is extinguished by the circulation operation during the extinction period t12, and the motor current attenuates. This circulation path 6A is shown in FIG. 6A.

When the motor current is in the high current range, on the other hand, the detected current of the current detection circuit 10 is higher than the reference current value (Vref), the output of the comparator 21 is changed to the H-level. At the time from the drive current supply period t21 to the extinction period t22, that is, at the time T2 when the current supply is shut off, the output of the comparator 20 is at the H-level.

The outputs of the register 21 and the latch 22 are changed from the L-level to the H-level. As a result, the outputs of the AND gate 25 and 26 are inverted to the L-level during the latch 22 produces the H-level (time T2 to T3). The MOSFET 13 and 14 are both forced to turn off irrespective of the drive command signals A1 and A2.

Figure 6B:
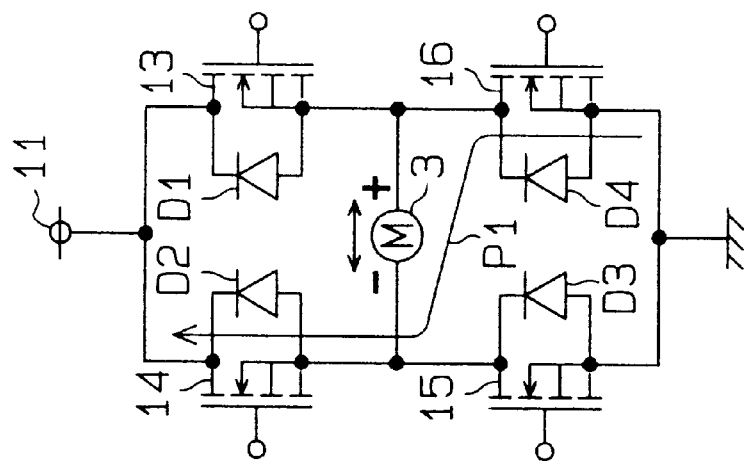

During the period from T2 to T3 in which the MOSFETs 13 and 14 are forced to turn off, the diodes D2 and D4 connected in parallel between the drain terminal and the source terminal of each MOSFET 14 and 16 are biased in the forward direction. That is, differently from the extinction period t12 in the case of the low current range, the circulation path R1 is opened to restrict extinction of energy through the circulation path R1. Instead, the remaining energy in the direct current motor is extinguished through the diodes D2 and D4. This energy extinguishing path P1 through the diodes D2 and D4 are shown in FIG. 6B.

When the output of the latch 22 returns to the L-level at time T3 after the predetermined interval t23 measured by the timer 23, the MOSFET 13 and 14 are turned on as commanded by the drive command signals A1 and A2. The latch 22 is cleared before the restart of the current supply (before the MOSFET 15 turns on). As a result, it does not occur that the controllability of the throttle valve 2 is lessened due to delay in starting the current supply.

Figure 6C:
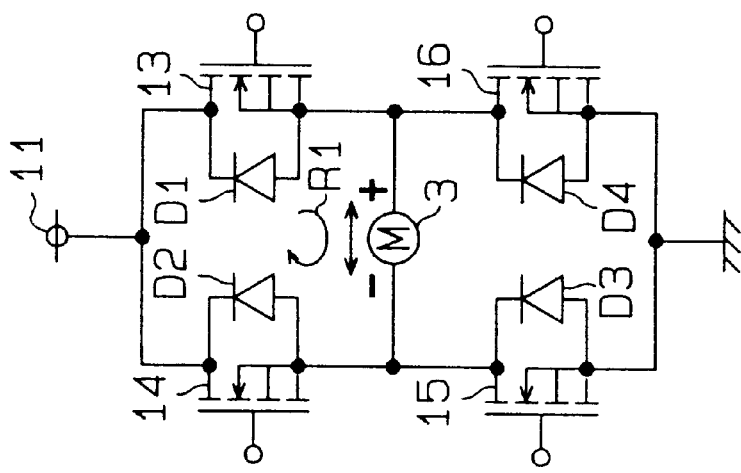

Although not shown, the energy extinction through the circulation path R1 is also restricted and the energy extinction through the diodes is effected, when the direct current motor 3 is energized in the reverse direction (direction C in FIG. 3) during the braking current supply period t2 in FIG. 5. That is, when the drive current supply is shut off and the remaining energy is to be extinguished, the detected current of the current detection circuit 10 exceeds the current reference value (Vref). The comparator 20 produces the H-level output signal, and the register 21 and the latch 22 produce the H-level output signals. The MOSFETS 13 and 14 are forced to turn off irrespective of the drive command signals A1 and A2. The diodes D1 and D3 connected in parallel between the drain terminal and the source terminal of each MOSFET 13 and 15 are biased in the forward direction to extinguish the remaining energy in the direct current motor 3. This extinguishing path is shown in FIG. 6C.

Figure 7:
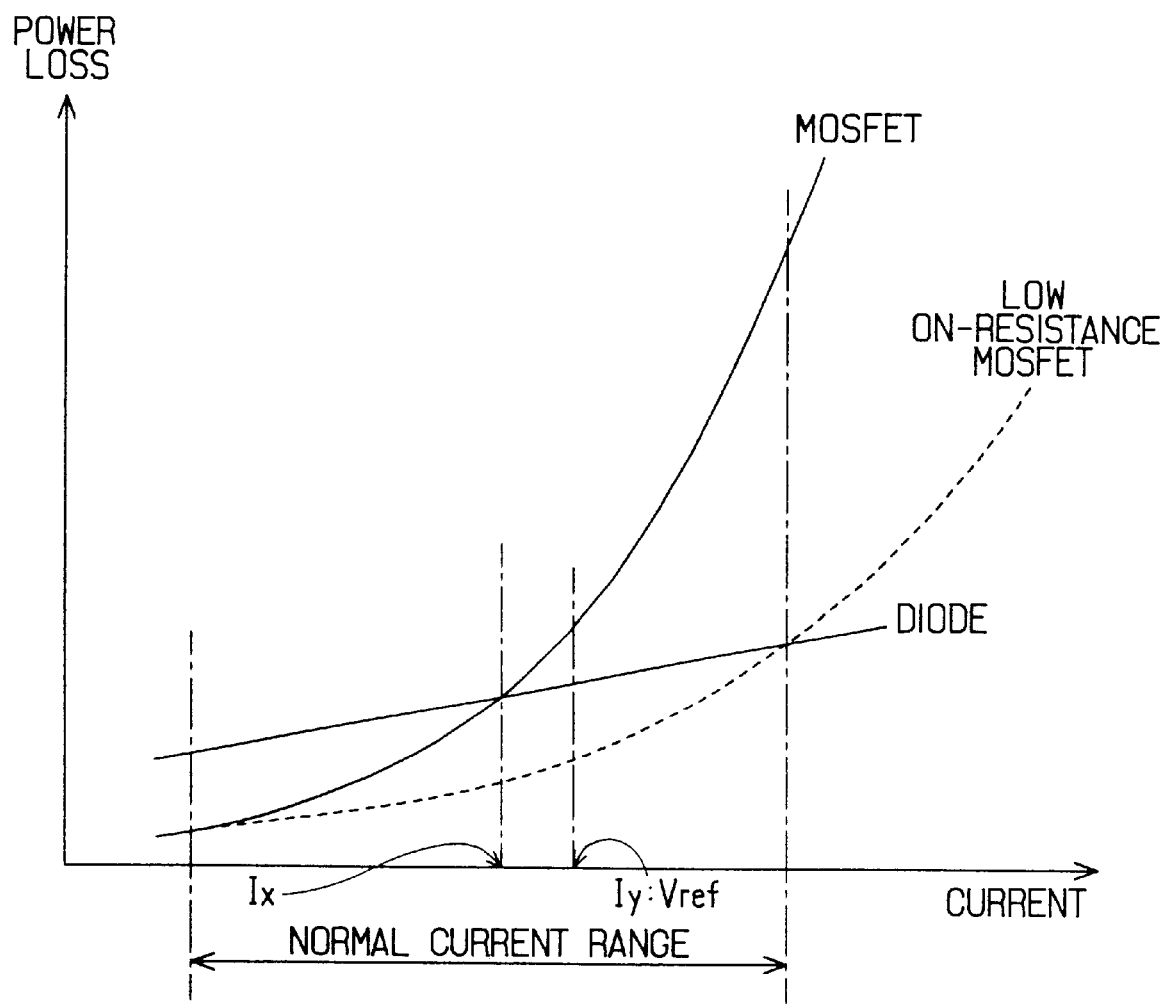
FIG. 7 is a graph showing a power loss in the first embodiment.

The reference voltage Vref used to check whether the motor current is in the high current range or in the low current range is determined based on the following reason. FIG. 7 shows a power loss characteristics of a MOSFET and a diode at the time of energy extinction operation. The power loss of the MOSFET is lower in the range in which the motor current is relatively low, and the power loss of the diode is lower in the range in which the motor current is relatively high. Therefore, the reference voltage Vref is set based on a current value Ix with which the power losses of the MOSFET and the diode equal.

It is, however, likely to occur that the motor current attenuates at the time of energy extinction by the diode in the high current range. If the motor current decreases to be lower than the level below which the biasing force of the return spring prevails, the angular position control for the throttle valve 2 is not stabilized. This disadvantage is obviated in this embodiment by setting the reference voltage Vref to a current value Iy which is a little higher than the current value Ix of FIG. 7.

According to the present embodiment, the following advantage is provided.

(a) The energy extinction operation is selectively effected by the circulation path or the diode based on the motor current. The energy generated in the coil or remaining in the direct current motor can be extinguished in less power loss over an entire range of currents. Thus, the power loss is reduced more than in the conventional device. the cost can be cut with the inexpensive MOSFET (switching device).

(b) The reference voltage Vref is set in relation to the current value Ix by comparing the power losses by the MOSFET and the diode. As a result, the optimum energy extinction can be attained in any current range. Further, the reference voltage Vref is set to correspond to the current value Iy which is higher than the current value Ix. Therefore, the motor current is restricted from decreasing excessively at the time of the energy extinction by the diode, thereby maintaining a desired motor operation required for the throttle control.

(c) when the motor current is in the high current range, the energy extinction by the diode is effected based on the predetermined time interval t23 measured by the timer 23 in which the motor current decreases to the fixed level. The motor current can be attenuated as desired for the optimum energy extinction operation.

(Second Embodiment)

Figure 8:
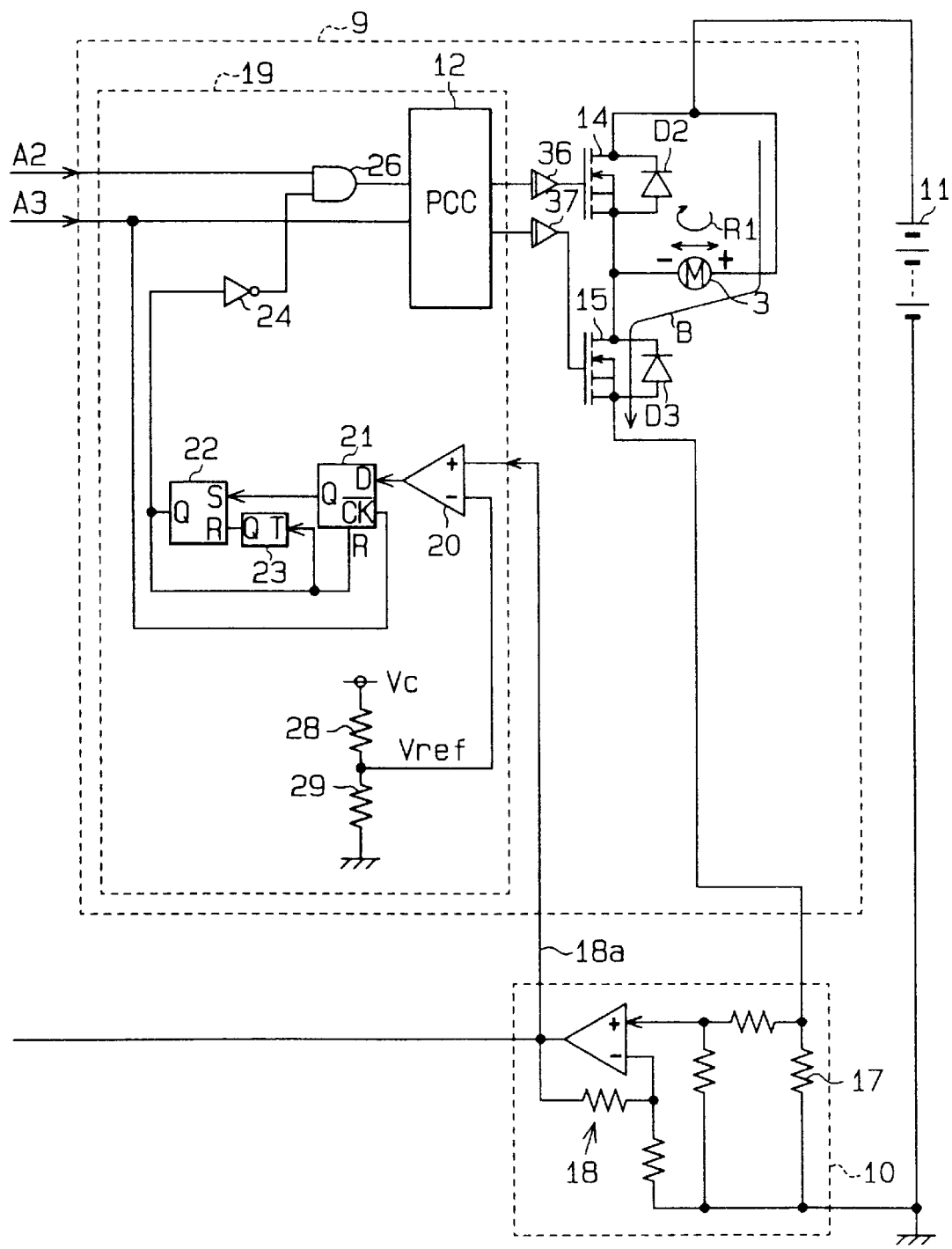
FIG. 8 is an electric circuit diagram showing the drive circuit used in a second embodiment of the present invention.

In a second embodiment shown in FIG. 8, the motor drive circuit 9 is constructed in a half-bridge type in which two MOSFETs 14 and 15 are used to control the direct current motor 3 only in one direction (forward rotation direction). In this instance, the throttle valve 2 is driven in the throttle opening direction by the direct current motor and is driven in the throttle closing direction by the return spring.

In this embodiment, as shown in FIG. 8, the MOSFETs 13 and 16 as well as the pre-drivers 35 and 38 are eliminated from the first embodiment (FIGS. 2 and 3). As there remains only the drive command signals A2 and A3, the drive command signal A2 is applied to the AND gate 26, and the AND gate 25 and the OR gate 27 are eliminated.

When the MOSFET 14 turns off and MOSFET 15 turns on, the motor current flows in the direction (motor forward rotation direction) B. When the MOSFET 14 turns on and the MOSFET 15 turns off, the energy generated and remaining in the coil of the direct current motor 3 is circulated thorough the closed circulation path R1 comprising the MOSFET 14 and the direct current motor 3.

Figure 9:
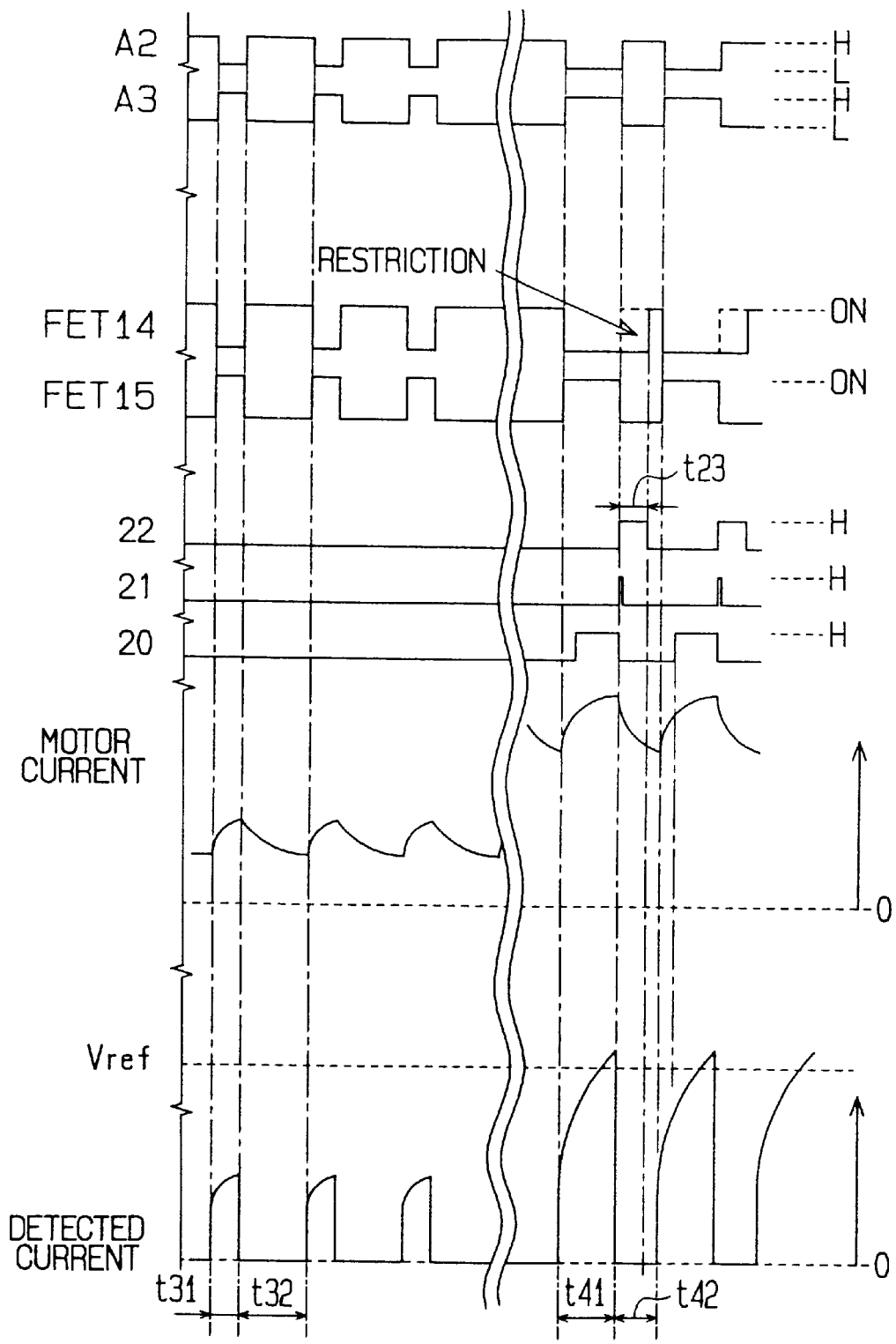
FIG. 9 is a timing diagram showing a part of an operation of the second embodiment.

The operation of the second embodiment is shown in FIG. 9. The left side and the right side of FIG. 9 show respectively the cases in which the motor current (detected current at the time of no current supply) is low and high, respectively. That is, left side shows an operation in the current holding period t0 in FIG. 5, and the right side shows an operation in the start-driving current supply period t1 in FIG. 5.

When the motor current is in the low current range, only the MOSFET 15 is turned on during a drive current supply period t31 to allow the motor current to flow in the direction B in FIG. 8. Only the MOSFET 14 is turned on to effect the current supply through the circulation path R1 in FIG. 8 during an energy extinction period t32 in which the drive current supply is shut off. Thus, the motor current increases during the drive current supply period t31, and the remaining energy in the coil is extinguished through the circulation path R1 during the energy extinction period t32.

That is, as the detected current of the current detection circuit 10 is lower than the current value (Vref) and the output of the comparator 20 is at the L-level at the moment at which the current supply is shut off, the outputs of the register 21 and the latch 22 both remains at the L-level. The output signal of the latch 22 is inverted to the H-level by the NOT gate 24 and applied to the AND gate 26. The MOSFET 14 turns on in response to the drive command signal A2. Thus, the remaining energy is extinguished by the circulation operation to attenuate the motor current during the energy extinction period t32.

When the motor current reaches a predetermined high current range, the detected current of the current detection circuit 10 exceeds the current value (Vref) in a drive current supply period t41, and the output of the comparator 20 changed to the H-level. At the moment of shutting off the current supply, that is, at the moment of change from the drive current supply period t41 to the energy extinction period t42, the output of the comparator 20 is at the H-level and the outputs of the register 21 and the latch 22 change from the L-level to the H-level. The output of the AND gate 26 is inverted to the L-level during the period in which the output of the latch 22 is at the H-level. As a result, the MOSFET 14 is forced to turn off irrespective of the drive command signal A2.

When the MOSFET 14 is forced to turn off, the diode D2 is forward-biased. That is, differently from the extinction period t32 in the case of the low current range, the circulation path R1 is opened in this extinction period t42 to restrict the energy extinction through the circulation. Instead, the energy extinction is effected through the diode d2.

When the predetermined time interval t23 elapses, the output of the latch 22 returns to the L-level to turn on the MOSFET 14 as commanded by the drive command signal A2. As the latch 22 is cleared before the current supply is re-started, that is, before the MOSFET 15 turns on. Therefore, it is less likely that the controllability of the throttle valve 2 is lessened due to delay in starting the current supply.

As long as the motor current remains in the high current range, that is, as long as the detected current at the time of shutting off the current supply, continues to be higher than the current value (Vref), the MOSFET 14 is forced to turn off temporarily to restrict the energy extinction through the circulation path R1. Instead, the remaining energy in the motor is extinguished through the diode D2.

In this embodiment, the energy extinction is effected by the single diode as opposed to the first embodiment in which the energy extinction is effected by two diodes. Therefore, the attenuation of the motor current during the period t42 in FIG. 9 is slower than that in the period t22 in FIG. 4. However, it is possible to attenuate the motor current by the similar amount by changing the predetermined interval t23 set in the timer 23.

According to the second embodiment, the remaining energy can be extinguished in less power loss over the entire range of normal current, because the energy extinction operation is selectively effected through the circulation path or the diode in the similar manner as in the first embodiment.

(Third Embodiment)

Figure 10:
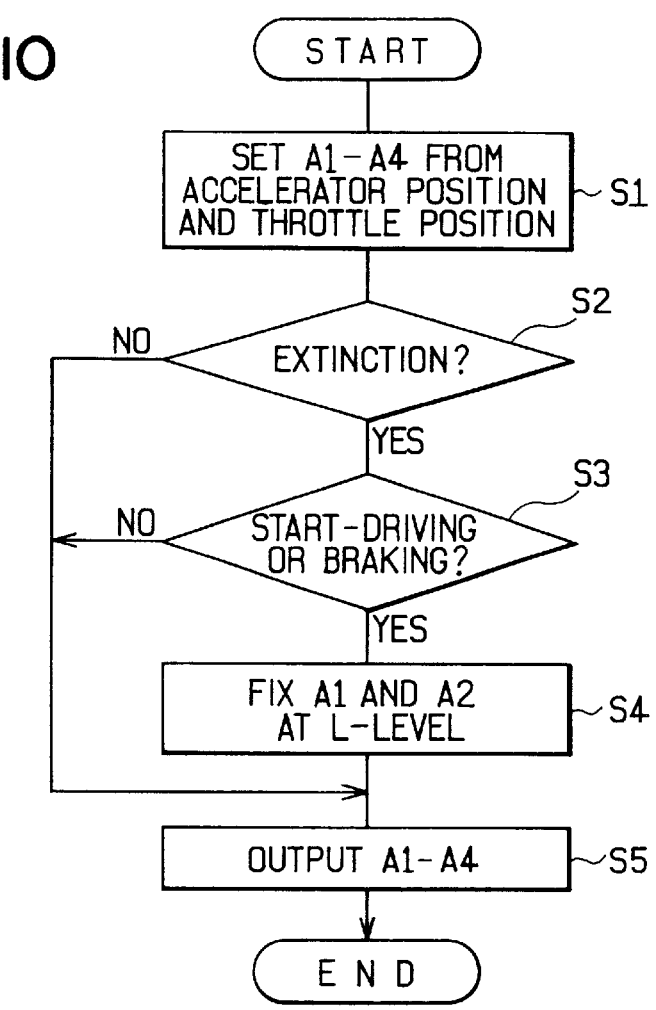
FIG. 10 is a flow diagram showing processing of a microcomputer used in a third embodiment of the present invention.

In a third embodiment, the microcomputer 8 is programmed to control the energy extinction operation by executing processing shown in FIG. 10. In this embodiment, therefore, the comparator 20, register 21, latch 22, timer 23 and the like in used in the first and second embodiments are not necessitated.

Figure 11:
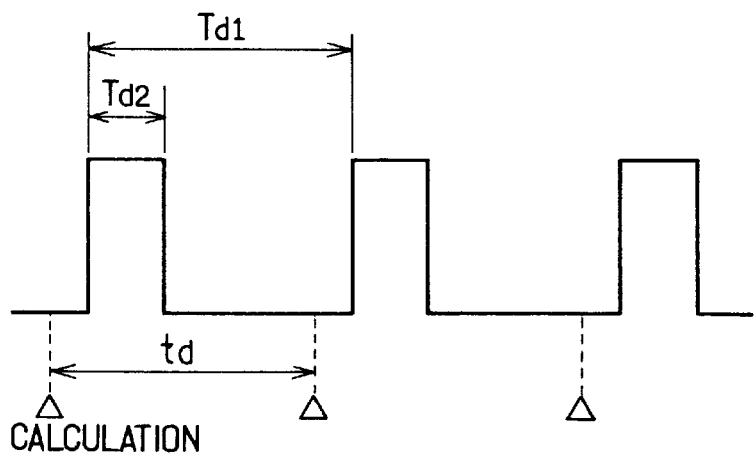
FIG. 11 is a timing diagram showing a calculation timing of the microcomputer in the third embodiment.
Figure 12A:
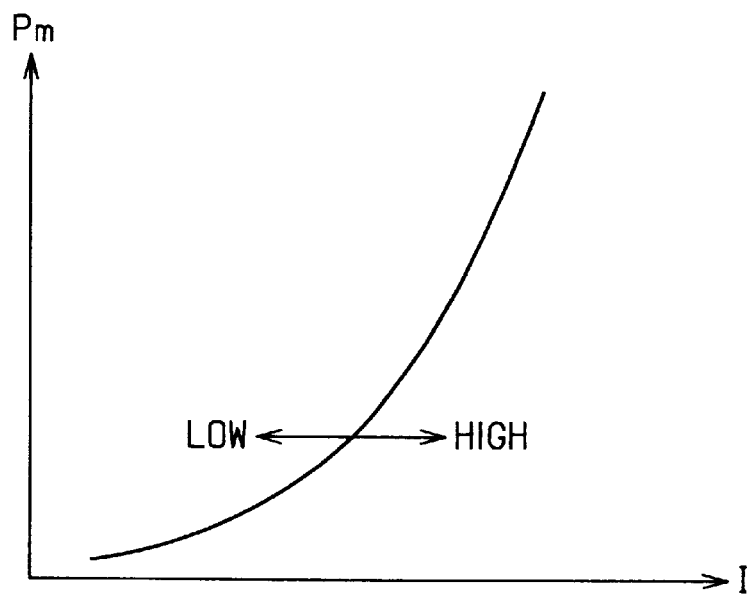
FIGS. 12A and 12B are graphs showing power losses in a conventional direct current motor drive control.
Figure 12B:
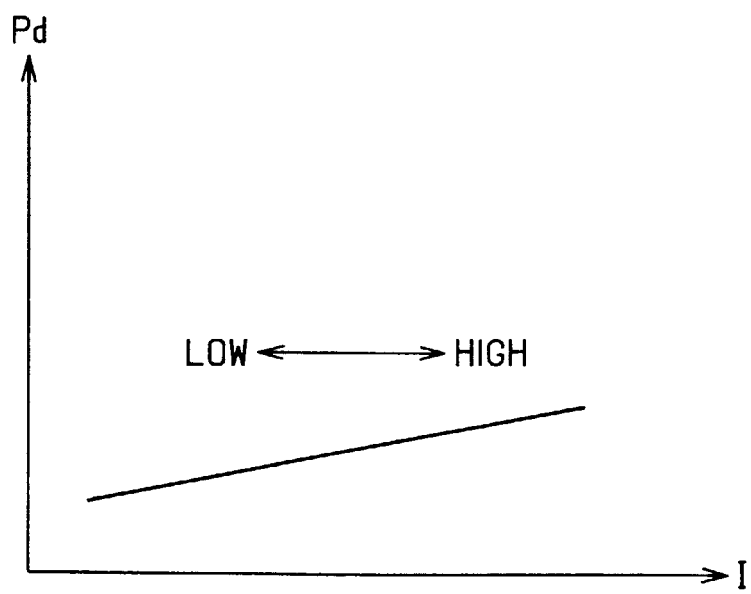

The microcomputer 8 repeatedly executes the processing of FIG. 10 every predetermined time period td which is sufficiently short not to influence throttle valve operation due to response delay. That is, as shown in FIG. 11, the period td is so determined that each duty signal having a variable duty ratio (=Td2/Td1) can be produced within the period td and will not cause unstable operation of the throttle valve Referring to FIG. 10, the microcomputer 8 sets at step S1 the drive command signals A1–A4 from the detected accelerator position, actual throttle angle and the like. Specifically, the basis target opening angle of the throttle valve 2 is calculated based on the detected accelerator position, and the final target opening angle is calculated by correcting the target angle based on detected engine coolant temperature. The direction of rotation and the duty ratio of the current supply of the direct current motor 3 are determined based on the difference between the final target opening angle and the detected actual opening angle, thus producing the drive command signals A1–A4.

The microcomputer 8 checks at step S2 whether it is the time to effect the energy extinction operation, that is, whether the drive command signal A3 changes to the L level to shut off the current supply to the direct current motor 3. The microcomputer 8 then checks at step S3 whether the start-driving current supply or braking current supply is presently being effected.

When the energy extinction operation is not required because of the current supply at 100% duty ratio, or the start-driving current or the braking current supply is not being effected, that is, the check result at either step S2 or S3 is NO, the microcomputer 8 produces the drive command signal A1–A4 as calculated at step S1 to the motor drive circuit 9, thus ending this energy extinction control processing. As a result, the energy extinction is effected through the circulation path R1 during the holding current supply period t0 in FIG. 5 in the low motor current range.

When the energy extinction is required and the start-driving current supply or the braking current supply is being effected, that is, the check results at steps S2 and S3 are YES, the microcomputer 8 fixes at step S4 the drive command signals A1 and A2 to the L-level. Then, the microcomputer 8 produces the drive command signals A1–A4 to the motor drive circuit 9, thus ending this energy extinction control processing. As a result, when the energy extinction operation is effected by the diodes during the start-driving current supply period or the braking current supply period (t1 and t2 in FIG. 4) in the high motor current range.

According to the third embodiment, the energy extinction operation is selectively effected based on the check result indicating the start-driving current supply period or the braking current supply period. As a result, the power loss at the time of energy extinction operation can be reduced over the entire range of normal currents.

The present invention should not be limited to the above embodiments, but may be implemented in other embodiments in the following manner.

The latch 22 and the timer 23 for restricting the current circulation during the time interval t23 may be so constructed that the latch 22 produces a L-level signal at the timing of starting the current supply after the output signal of the latch 22 is changed to the H-level, that is, at the timing when the drive command signal A3 changes from the L-level to the H-level in FIGS. 4 and 9. More specifically, during the energy extinction period t22 in FIG. 4 or t42 in FIG. 9, the restriction of the current circulation operation is continued (extinction through diode) while maintaining the output of the latch 22 at the H-level.

The reference voltage Vref may be set to correspond to the current value Ix (FIG. 11) at which the power losses of the MOSFET and the diode equal, if the biasing force of the return spring in the throttle closing direction need not be taken in account.

Step S4 in FIG. 10 may be modified to fix the drive command signals A1 and A2 at the L-level for a predetermined fixed time period. In this instance, the fixed time period is preferably determined so that the motor current decreases a predetermined level before the start of the next current supply.

The H-bridge type drive circuit may be so constructed that the MOSFETs at the high side are alternately turned on and off while maintaining the MOSFETs at the low side turned on or off.

The MOSFETs in the motor drive circuit may be replaced with other switching devices, and the diode of the switching device need not be a built-in body diode type but may be connected externally.

The direct current motor may be replaced with an electromagnetic solenoid actuator including a coil. In this instance, the drive circuit may be constructed in the half-bridge type (FIG. 8) because the solenoid actuator is energized only in one of throttle opening and closing directions.

What is claimed is:

1. A load drive control apparatus for an electrical load comprising:

switching means provided to energize and deenergize the electrical load;

diode means connected in parallel with the switching means;

current detection means for detecting a current flowing in the electrical load during an energization of the electrical load; and control means for turning on the switching means to form a closed current circulation path including the electrical load in a period of a deenergization of the electrical load when the detected current is in a predetermined low current range, and for turning off the switching means to open the closed current circulation path and bias the diode means in a forward direction in a period of the deenergization of the electrical load when the detected current is in a predetermined high current range.

2. A load drive control apparatus as in claim 1, wherein the control means includes:

check means for checking whether the detected current flowing in the electrical load at or before a moment of the deenergization of the electrical load is higher than a predetermined current value; and signal producing means for producing a signal to the switching device to forcedly turn off the switching means in the current circulation path in the period of the deenergization of the electrical load when a check result indicates that the detected current is higher than the predetermined current value.

3. A load drive control apparatus as in claim 2, wherein:

the predetermined current value is set in relation with a current value at which power losses of the switching means and the diode means equal at the time of an energy extinction operation.

4. A load drive control apparatus as in claim 1, wherein:

the control means is for effecting a holding current supply in the low current range when an amount of driving the electrical load is small, and for effecting a start-driving current supply in the high current range when the amount of driving the electrical load is large; and control means is for turning on the switching means to form the closed current circulation path in the period of the deenergization of the electrical load when the holding current supply is effected, and for turning off the switching means to open the closed current circulation path and bias the diode means in a forward direction in a period of the deenergization of the electrical load when the start-driving current supply is effected.

5. A load drive control apparatus as in claim 1, wherein:

the control means is for turning off the switching means to bias the diode means in the forward direction for a predetermined time period in which the detected current decreases to a predetermined level after a change from the energization to the deenergization and before a next energization of the electrical load.

6. A load drive control apparatus as in claim 1, wherein:

the switching means includes four switching devices connected in an H-bridge type relative to the electrical load;

the diode means includes four diodes connected in parallel with the switching devices, respectively; and a diagonally opposing pair of the switching devices are simultaneously turned on to energize the electrical load in accordance with a direction of a current supply to the electrical load.

7. A load drive control apparatus as in claim 1, wherein:

the switching means includes a pair of switching devices connected in series with the current detection means; and one of the switching means is connected in parallel with the electrical load.

8. A load drive control apparatus as in claim 7, wherein:

the electrical load is a solenoid valve including an inductive coil.

9. A load drive control apparatus as in claim 1, wherein:

the electrical load is normally biased in a predetermined direction; and the predetermined current value is set to be higher than a current value at which power losses of the switching means and the diode equal at the time of an energy extinction operation.

10. A load drive control apparatus as in claim 1, wherein:

the electrical load is an direct current motor and connected to drive a throttle valve of an internal combustion engine.

11. A load drive control apparatus for energizing and deenergizing an inductive load comprising:

switching devices connected to the inductive load;

diodes connected in parallel with the switching devices, respectively;

current detection circuit for detecting a current supplied to the inductive load immediately before deenergizing the inductive load;

controller for turning on and off the switching devices to energize and deenergize the inductive load, the controller being for selectively turning on or off the switching devices to extinguish energy generated in the inductive load at the time of changing from an energization to a deenergization of the inductive load through either the diodes or the switching devices based on a magnitude of the detected current.

12. A load drive control apparatus as in claim 11, wherein:

the magnitude of the detected current is smaller in the case of extinguishing the energy through the switching devices than in the case of extinguishing the energy through the diodes.

13. A load drive control apparatus as in claim 11, wherein:

extinguishing the energy through the switching devices and the diodes are effected when the magnitude of the detected current is smaller and higher than a predetermined level which is set higher than a reference level at which power losses of the switching devices and the diodes equal, respectively.

14. A load drive control apparatus for an electrical load comprising:

switch provided to energize and deenergize the electrical load;

at least one diode connected in parallel with the switch;

current detector for detecting a current flowing in the electrical load during an energization of the electrical load; and controller for turning on the switch to form a closed current circulation path including the electrical load in a period of a deenergization of the electrical load when the detected current is in a predetermined low current range, and for turning of the switch to open the closed current circulation path and bias the at least one diode in a forward direction in a period of the deenergization of the electrical load when the detected current is in a predetermined high current range.

\* \* \* \* \*